3,164,581
METHOD FOR DERIVING GLYCYRRHIRIC PRODUCTION
Ivan Alexeevich Muravjev, Rubin St. 5, Apt. I, and Veniamin Danilivich Ponomarev, Dzerzhinsky St. 22, Apt. 7, both of Pjatigorsk, U.S.S.R.
No Drawing. Filed June 10, 1963, Ser. No. 286,452
3 Claims. (Cl. 260—210.5)

The invention relates a method for producing of pharmaceuticals, more specifically to produce glycyrrhiric acid from vegetable raw materials.

The glycyrrhiric acid, a main active substance of the liquorice, is widely spread in the modern medicine. It is found that this acid has a deoxycorticosteroid-like effect, intensifies the activity of corticoid hormones exerts antiinflammatory and antitoxic action. This acid is used in treatment of the Addison's disease, poisoning, allergic, skin, mental and eye diseases. It is well known that the main source of glycyrrhizin [or of the glycyrrhiric acid derived from it in the form of the ammonium salt] are the roots and rhizomes of the liquorice [*Glycyrrhiza glabra* L.].

The known method for the glycyrrhiric acid production is based upon deriving the liquorice water extracts precipitating the raw glycyrrhiric acid from them with the aid of mineral acids, purifying the precipitate from the ballast substances with the alcohol or ether, precipitating the ammonium or potassium salts of the glycyrrhiric acid from the alcohol solution and crystallizing the derived salt from the glacial acetic acid and the alcohol. The glycyrrhiric acid isolated from the salts through the salt of Pb which is decomposed in the alcohol medium by $H_2S$.

The described process for the glycyrrhiric acid production is complicated and it requires several days for its completion.

We have found that the said drawback of the known methods can be eliminated and the glycyrrhiric acid and its salts can be simply and readily produced from certain raw materials cutting prolonged production operations of obtaining liquorice water extracts and of purifying the resulted glycyrrhiric acid. We have also found the possibility for extension of the raw material source for supplying the glycyrrhiric acid production and a specific plant containing the said acid in an amount considerably exceeding the content of this acid in the previously known *Glycyrrhiza glabra* L.

The object of the present invention is to provide a considerable simplification of the technology for deriving the glycyrrhiric acid and its salts from the liquorice.

Another object is to provide substantial increase of the yield of the said acid.

A further object is to provide a speeding up of the process of the acid and its salts isolation.

One more object is to raise the degree of purity of the produced glycyrrhiric acid.

Still another object is to extend the raw material source for production of the said acid on a commercial scale.

One more object is to provide vegetable raw materials richer in glycyrrhiric acid content and more readily available than the known sources.

The listed object of the present invention ensures the increase of the economic effect of the acid manufacture and a considerable cutting of production cost of the glycyrrhiric acid and of its salts.

According to the mentioned objects the present invention is based upon a new method of the glycyrrhiric acid and its salts isolation from vegetable raw materials and upon a new kind of raw materials best suitable for deriving the acid described and presented for patenting in the given specification.

It will be understood that at the exact embodiment of the invention changes are possible within the limits of the scope of the invention without departure from the inventive concept.

According to the present method for the production of glycyrrhiric acid and its salts from vegetable raw materials containing it, for instance, from the roots and rhizomes of the Korshinskyis liquorice where the content of the glycyrrhiric acid exceeds that of the same acid in the *Glycyrrhiza glabra* L. By 1.5–2 times, the ground raw material is treated by the acetone acidified with $HNO_3$, with the subsequent neutralization of the solution by means of ammonia and the extraction of the glycyrrhiric acid from the ammonium glycyrrhizate by the known methods.

The extraction process of the liquorice with the acidified acetone is carried out rapidly, and the glycyrrhiric acid contained in it mainly in the form of the potassium and calcium salts is as a rule extracted during one hour. To obtain the residues of the glycyrrhiric acid extraction are to be repeated. The acetone dissolving the glycyrrhiric acid quite well can extract the concomitant admixtures only in negligible amounts. The ammonium glycyrrhizate precipitated from the derived acetone extracts by the addition of the ammonium concentrated solution is separated, dried and crystallized from the glacial acetic acid by the known methods.

The glycyrrhiric acid can be derived from the roots and rhizomes of the Glycyrrhiza Korshinskyi g. grig. by the method described in the present invention, or by the formerly known methods; in any case the yield of the final product would be higher.

The following examples of the embodiment of the present invention are cited to make it better understood to those who are skilled in the art.

*Example I*

The finely divided powdered liquorice is extracted intensely agitating it with added to it 10 volumes of acetone containing 3 percent of $HNO_3$ for an hour. The extract is drained, while the powdered liquorice is treated three times each time with 10 volumes of acetone for 0.4 hour.

A 30 percent solution of ammonia is added on stirring to the combined acetone extracts until a steady odour has appeared. The precipitated residue of the ammonium glycyrrhizate is separated, dried and recrystallized from 3 volumes of glacial acetic acid. The purified ammonium glycyrrhizate is dissolved in 10 volumes of hot water and 10 volumes of 10 percent solution of lead acetate are added to it. The resulted precipitate of the lead glycyrrhizate is first separated, then washed with water and finely elutriated in 20 volumes of alcohol. $H_2S$ is then passed through the resulted suspension up to the complete dissolution of the white particles.

The alcoholic solution of the glycyrrhiric acid is separated from the precipitate of lead sulfide which is washed with alcohol several times. The alcohol extracts are combined and the alcohol distilled off on the water bath. The derived glycyrrhiric acid is recrystallized then from 3 volumes of the acetic acid and finely from the alcohol. The produced purified glycyrrhiric acid represents a white crystalline powder of a sweet taste; its melting point 208–210° C.

*Example II*

The roots and rhizomes of the Korshinskyi's liquorice were dried, ground and then extracted with water or the 1 percent ammonia or soda solution. The extract was steam treated, filtered and acidified with diluted 10–15 percent $H_2SO_4$.

The precipitate was washed with water up to the neutral reaction and dissolved with 5–10 percent ammonia;

the solution was filtrated, and the resulted filtrate was steam treated, thereby isolating glycyrrhizin in the form of a dark coloured powder. The yield of glycyrrhizin containing 30–35 percent of the pure glycyrrhiric acid was not less than 6–7 percent (air-dry root basis).

What is claimed is:

1. A method of producing glycyrrhiric acid from liquorice comprising extracting ground dried rhizomes of the liquorice with acetone acidified with $HNO_3$ and then treating the resulting liquid extract with ammonia; recovering the ammonium glycyrrhizate so produced; recrystallizing the ammonium glycyrrhizate from glacial acetic acid, dissolving the recrystallized salt in hot water, precipitating lead glycyrrhizate from the solution by the addition of the lead acetate, suspending the lead glycyrrhizate in alcohol; passing $H_2S$ through the resulting suspension, separating the alcohol solution of the resulting glycyrrhiric acid from the accompanying precipitate, removing the alcohol from said alcohol solution by heating the solution; and recrystallizing of the glycyrrhiric acid from acetic acid and alcohol.

2. The method of claim 1 using the roots and rhizomes of Glycyrrhiza Korshinskyi g. grig. as raw materials.

3. The production of ammonium glycyrrhizate which comprises extracting liquorice by means of acetone acidified with $HNO_3$, precipitating ammonium glycyrrhizate from the resulting extract and crystallizing the ammonium glycyrrhizate from acetic acid and alcohol.

References Cited in the file of this patent

UNITED STATES PATENTS

| | | |
|---|---|---|
| 2,224,804 | Wolf | Dec. 10, 1940 |
| 3,046,195 | Zagt | July 24, 1962 |

FOREIGN PATENTS

| | | |
|---|---|---|
| 557,755 | Canada | May 20, 1958 |